(12) United States Patent
Gottin et al.

(10) Patent No.: US 11,663,243 B2
(45) Date of Patent: May 30, 2023

(54) SYSTEM AND METHOD FOR OBJECT DETECTION

(71) Applicant: EMC IP Holding Company LLC, Hopkinton, MA (US)

(72) Inventors: Vinicius Michel Gottin, Rio de Janeiro (BR); Tiago Salviano Calmon, Rio de Janeiro (BR); Paulo Abelha Ferreira, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 332 days.

(21) Appl. No.: 17/161,541

(22) Filed: Jan. 28, 2021

(65) Prior Publication Data

US 2022/0237211 A1 Jul. 28, 2022

(51) Int. Cl.
*G06F 16/00* (2019.01)
*G06F 16/28* (2019.01)

(52) U.S. Cl.
CPC .................................. *G06F 16/285* (2019.01)

(58) Field of Classification Search
CPC ..................................................... G06F 16/285
USPC ......................................................... 707/737
See application file for complete search history.

(56) References Cited

U.S. PATENT DOCUMENTS

2018/0165554 A1\* 6/2018 Zhang ................. G06F 18/2411
707/707

OTHER PUBLICATIONS

Scheirer, Jain and Boult, Probability Models for Open Set Recognition, IEEE Transactions on Pattern Analysis and Machine Intelligence, vol. 36, No. 11, Nov. 2014, 8 pages.
(Continued)

*Primary Examiner* — Alexandria Y Bromell
(74) *Attorney, Agent, or Firm* — Chamberlain, Hrdlicka, White, Williams & Aughtry

(57) ABSTRACT

An information handling system for managing detection of objects includes a storage and a processor. The storage is for storing an encoder; a critical class classifier; a general classifier; and a decoder. The processor obtains data that may include one or more of the objects; encodes the data using the encoder to obtain encoded data; obtains a critical class classification for the encoded data using the critical class classifier; obtains a general classification for the encoded data using the general classifier; conditions the encoded data to obtain conditioned encoded data; decodes the conditioned encoded data using the decoder to obtain reconstructed data; makes a determination that the reconstructed data and the critical class classification indicate that the data is an unknown classification; classifies the data as being an unknown classification based on the determination; and performs an action set based on the unknown classification of the data.

20 Claims, 9 Drawing Sheets

(56) References Cited

OTHER PUBLICATIONS

Blalock, Ortiz, Frankle and Guttag, What is the State of Neural Network Pruning, arXiv:2003.03033v1 [cs.LG] Mar. 6, 2020, 18 pages.
Qin, Yu, Liu and Chen, CAPTOR: A Class Adaptive Filter Pruning Framework for Convolutional Neural Networks in Mobile Applications, ASPDAC '19, Jan. 21-24, 2019, Tokyo, Japan, 6 pages.
Model Specialization for Inference Via End-to-End Distillation, Pruning, and Cascades, ICLR 2018, 10 pages.
Oza and Patel, C2AE: Class Conditioned Auto-Encoder for Open-set Recognition, arXiv:1904.01198v1 [cs.CV] Apr. 2, 2019, 13 pages.
Wong, Wang, Ren, Liang and Urtasun, Identifying Unknown Instances for Autonomous Driving; arXiv:1910.11296v1 [cs.CV] Oct. 24, 2019, 11 pages.

\* cited by examiner

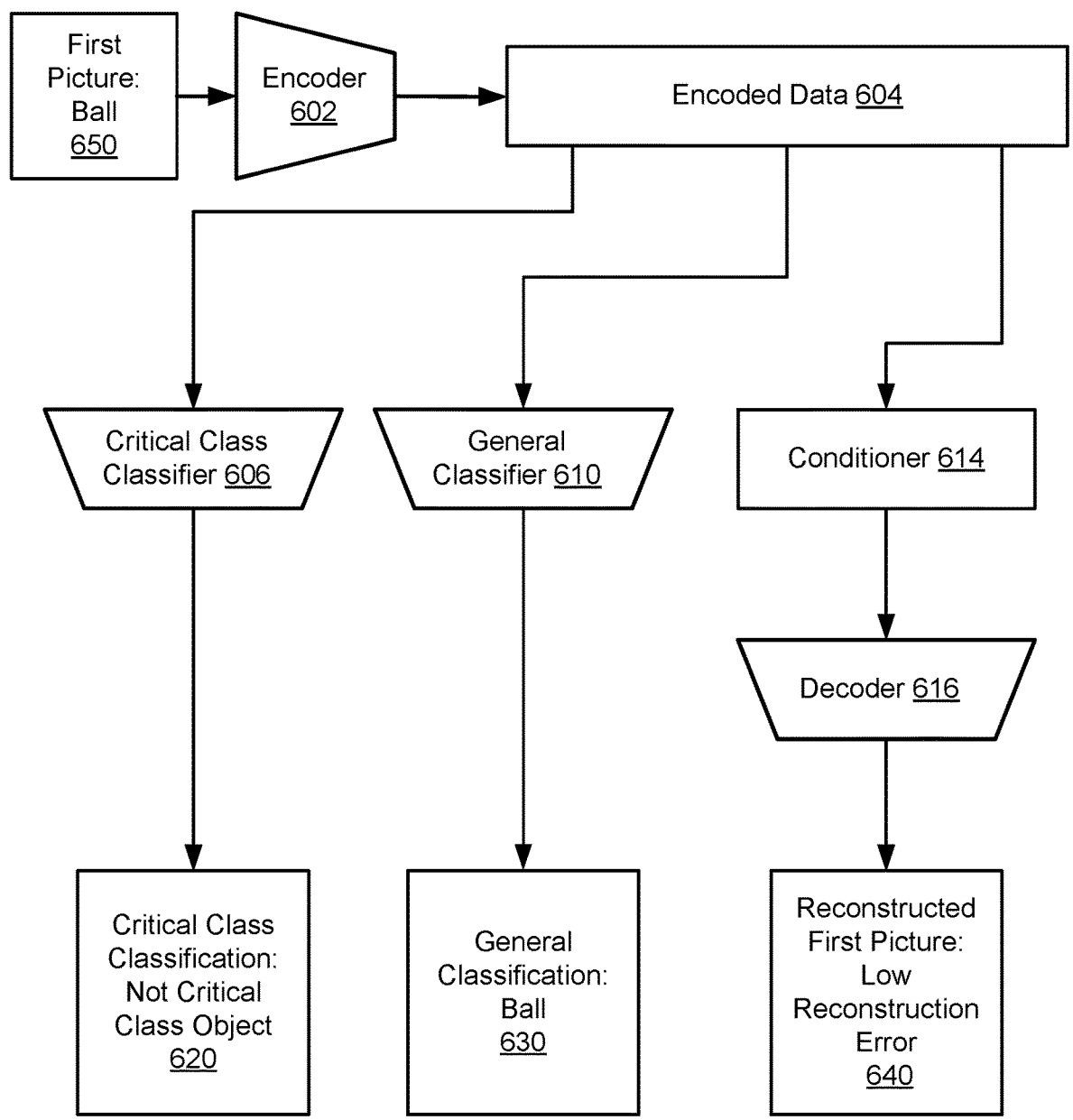
FIG. 6.1

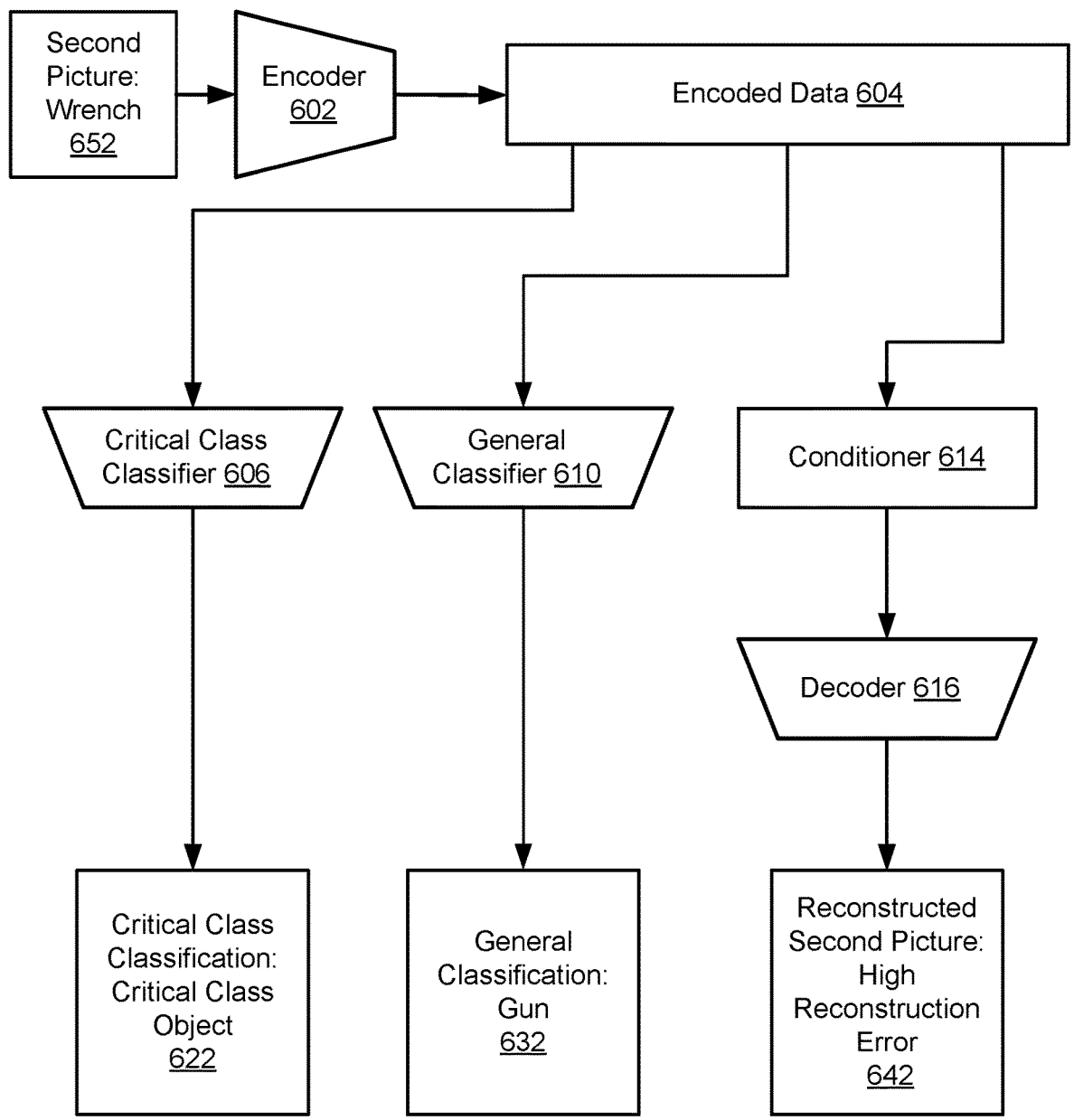
FIG. 6.2

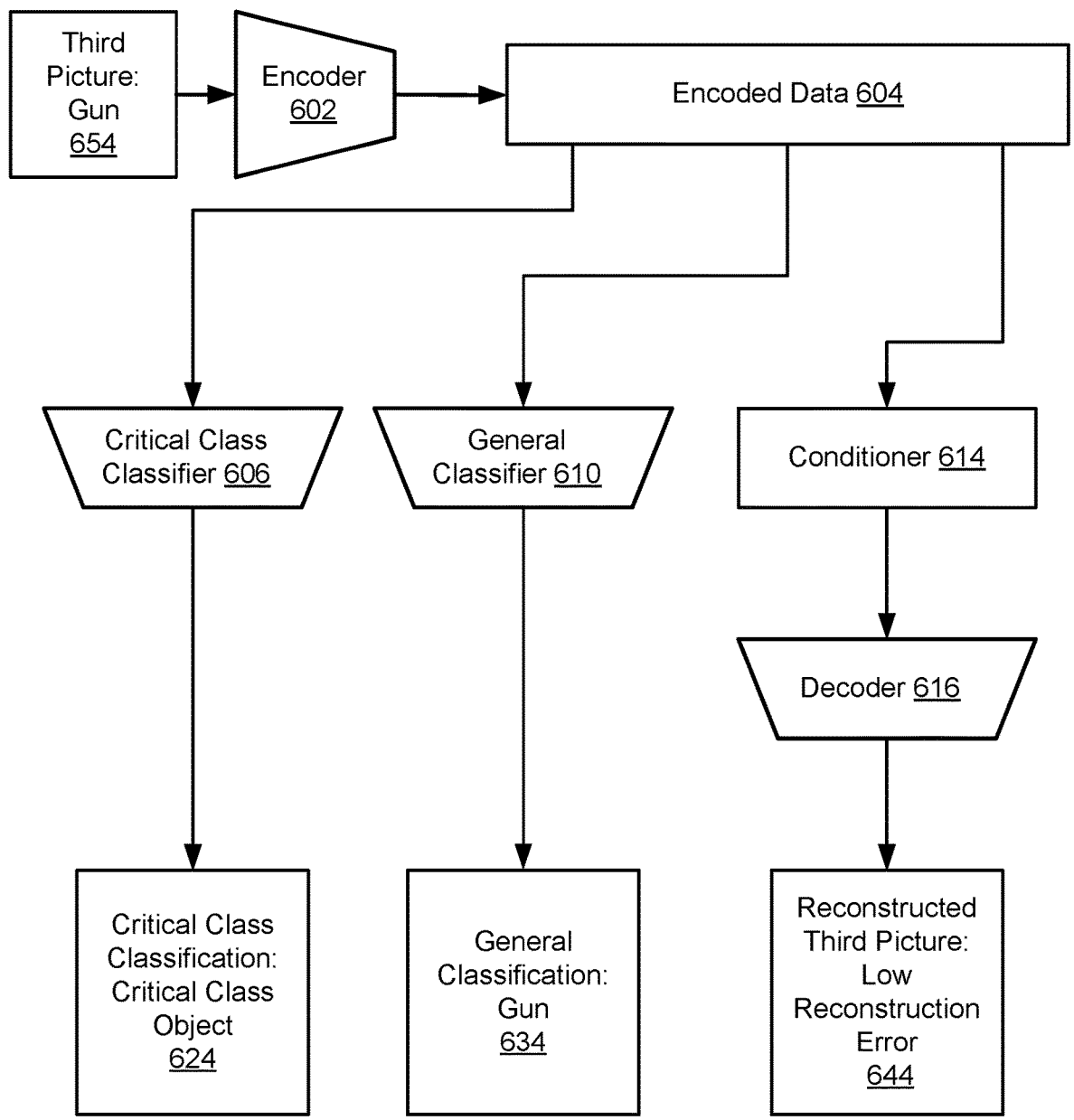
FIG. 6.3

SYSTEM AND METHOD FOR OBJECT DETECTION

BACKGROUND

Computing devices may provide services. To provide the services, the computing devices may include hardware components and software components. The services provided by the computing devices may be limited by these components.

SUMMARY

In one aspect, an information handling system for managing detection of objects in accordance with one or more embodiments of the invention includes a storage and a processor. The storage is for storing an encoder; a critical class classifier; a general classifier; and a decoder. The processor obtains data that may include one or more of the objects; encodes the data using the encoder to obtain encoded data; obtains a critical class classification for the encoded data using the critical class classifier; obtains a general classification for the encoded data using the general classifier; conditions the encoded data to obtain conditioned encoded data; decodes the conditioned encoded data using the decoder to obtain reconstructed data; makes a determination that the reconstructed data and the critical class classification indicate that the data is an unknown classification; classifies the data as being an unknown classification based on the determination; and performs an action set based on the unknown classification of the data.

In one aspect, a method for managing detection of objects in accordance with one or more embodiments of the invention includes obtaining data that may include one or more of the objects; encoding the data using an encoder to obtain encoded data; obtaining a critical class classification for the encoded data using a critical class classifier; obtaining a general classification for the encoded data using a general classifier; conditioning the encoded data to obtain conditioned encoded data; decoding the conditioned encoded data using a decoder to obtain reconstructed data; making a determination that the reconstructed data and the critical class classification indicate that the data is an unknown classification; classifying the data as being an unknown classification based on the determination; and performing an action set based on the unknown classification of the data.

In one aspect, a non-transitory computer readable medium in accordance with one or more embodiments of the invention includes computer readable program code, which when executed by a computer processor enables the computer processor to perform a method for managing detection of objects, the method includes obtaining data that may include one or more of the objects; encoding the data using an encoder to obtain encoded data; obtaining a critical class classification for the encoded data using a critical class classifier; obtaining a general classification for the encoded data using a general classifier; conditioning the encoded data to obtain conditioned encoded data; decoding the conditioned encoded data using a decoder to obtain reconstructed data; making a determination that the reconstructed data and the critical class classification indicate that the data is an unknown classification; classifying the data as being an unknown classification based on the determination; performing an action set based on the unknown classification of the data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 6.1-6.3 show diagrams illustrating the operation of a data analysis system over time in accordance with one or more embodiments of the invention.

DETAILED DESCRIPTION

Figure 1:
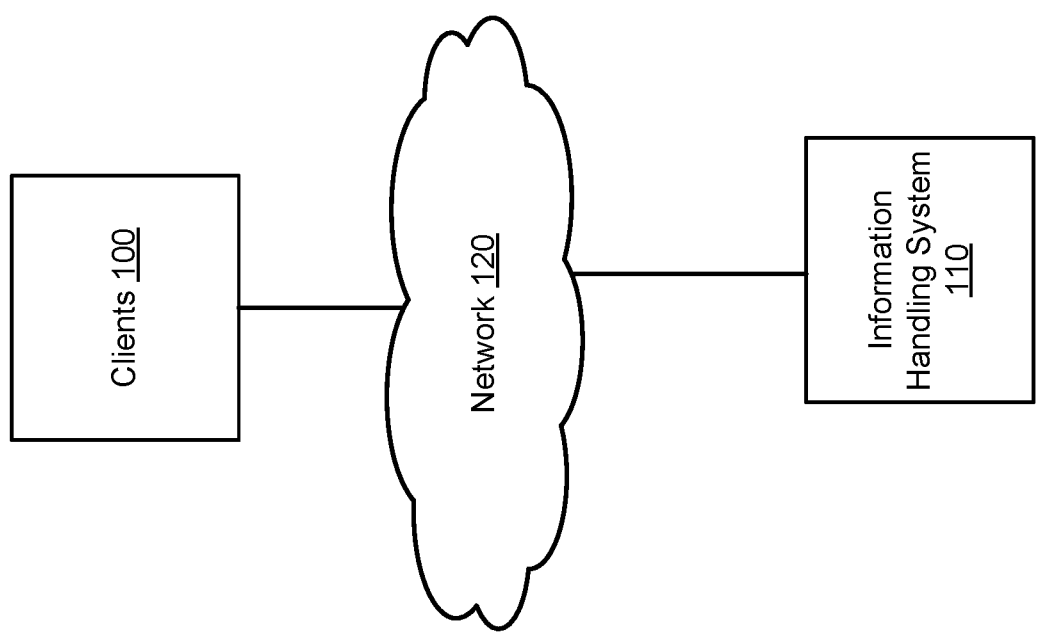
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for classifying data. Data may include information that is both explicitly declared and undeclared. For example, a picture file may specify the characteristics (e.g., color, location) of any number of pixels. However, the arrangement of the pixels may include undeclared information in the form of images or representations of the real world. This undeclared information may be referred to as an object in the data that is undeclared. While described with respect to a picture file, one of ordinary skill in the art will appreciate that other types of data may also include undeclared data.

Embodiments of the invention may facilitate identification of undeclared information in data. Specifically, embodiments of the invention may provide for the classification of data to identify objects within the data. The classification of these objects in the data may be used for any number and type of purposes including, for example, identification of persons or objects in the real world, identification of features in seismographic data, identification of features in computerized tomography scans, and/or other purposes.

For many purposes, it may be more important to identify the presence of some classes of objects over others. For example, in autonomous systems (e.g., such as autonomous driving vehicles), it may be critically important to identify the presence of pedestrians in pictures to enable the autonomous systems to avoid contact with the pedestrians.

To provide for the identification of critical classes of objects, a system in accordance with embodiments of the invention may generate a data analysis model to classify objects. However, the data analysis model may not be perfect. It may misclassify objects or make other errors.

To reduce the risk of misclassification, the data analysis model may generally limit the size of inferences that it makes when classifying objects. If an inference is too large, the data analysis model may treat data as including an object but of an unknown class (rather than a known class). However, when a critical class object is believed to be present, the data analysis model may increase the size of the inference that it is will to make when classifying the data. Consequently, the data analysis system may be more likely to classify objects as critical class objects than as unknown objects.

By preferentially classifying objects as critical class objects, the data analysis model may be more likely to provide useful results regarding the presence of critical class objects. For example, returning to the autonomous vehicle example, the data analysis model may be more likely to classify an object as a critical class object thereby limiting the potential for contact between the autonomous vehicle and pedestrians.

Turning to FIG. 1, FIG. 1 shows a system in accordance with one or more embodiments of the invention. The system may include any number of clients (100). The clients (100) may provide computer implemented services to users of the clients (100) and/or other devices (e.g., other clients). The clients (100) may provide any number and type of computer implemented services (e.g., data storage services, electronic communication services, etc.).

To provide these computer implemented services, the entities hosted by the clients (e.g., applications) may utilize information from any number of sources. For example, the clients (100) may collect information, may obtain information from other entities, etc.

The information collected by the clients (100) may include multidimensional information which may not be immediately discernable from the data structures in which the information is stored. The data structures in which the multidimensional information is stored may only explicitly specify a portion of the multidimension information included in the data structure.

For example, pictures other types of graphical information may be collected. These data structures may explicitly specify the characteristics of each pixel in the pictures. However, collections of pixels may yield other information (e.g., objects) when viewed by a person.

A collection of pixels may include information regarding a person (e.g., an image of a person). However, because the data structure does not explicitly specify the presence of the person in the picture, the data structure may need to be analyzed to obtain the objects or other information present in the data structures not explicitly specified as being included in the data structures.

Analysis of data structures that include information not explicitly specified by the data structures to obtain the information may be a computationally expensive task. By virtue of the limited computing resources available to the clients (100), it may be impractical to perfectly analyze each data structure to ascertain all of the information included therein. Further, for many applications, only the presence of a subset of all of the objects that may possibly be present in the data structures may be required for proper operation of the applications.

In general, embodiments of the invention relate to systems, devices, and methods for analyzing data structure to ascertain whether objects are present within the data structures. Specifically, embodiments of the invention may provide a method for analyzing data structures that is more likely to identify the presence of certain classes of objects in a data structure. By focusing the limited resources of the clients on identifying these particular classes of objects, the clients (100) may be better able to identify these objects thereby enabling them to fulfill their functionalities while limiting resource consumption.

To do so, the system of FIG. 1 may include an information handling system (110) that provides data analysis services to the clients (100). The data analysis services may include (i) obtaining data that may be utilized to generate analyzation models usable to identify objects that are relevant to the applications hosted by the clients, (ii) generating the analyzation models for the clients using the data, (iii) distributing the analyzation models to the clients which in turn may utilize the analyzation models to identify objects in data, and/or (iv) performing actions based on analysis of data using the analyzation models to enable the clients (100) to perform their respective functionalities.

To enable the information handling system (110) to perform its functionality, the clients (100) may cooperate by, for example, providing data that includes examples of objects that are relevant to their respective applications, providing information regarding whether analysis models are providing desired results (e.g., detecting the presence of objects), and/or perform other actions under the direction of the information handling system (110).

The system of FIG. 1 may include any number of clients (100) and information handling systems (110) that provide analysis services to the clients (100). Any of the components of FIG. 1 may be operably connected to any other component and/or other components not illustrated in FIG. 1 via one or more networks (e.g., 120). The networks (e.g., 120) may be implemented using any combination of wired and/or wireless network topologies. The networks may employ any number and types of communication schemes to enable the clients (100) and information handling systems to communicate with each other.

The clients (100) and information handling system (110) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the clients (100) and information handling system (110) described in this application and/or all, or a portion, of the methods illustrated in FIGS. 3-4. The clients (100) and information handling system (110) may be implemented using other types of computing devices without departing from the invention. For additional details regarding computing devices, refer to FIG. 7. For additional details regarding the information handling system (110), refer to FIG. 2.

While the system of FIG. 1 has been illustrated and described as including a limited number of specific components, a system in accordance with embodiments of the invention may include additional, fewer, and/or different components without departing from the invention.

Figure 2:
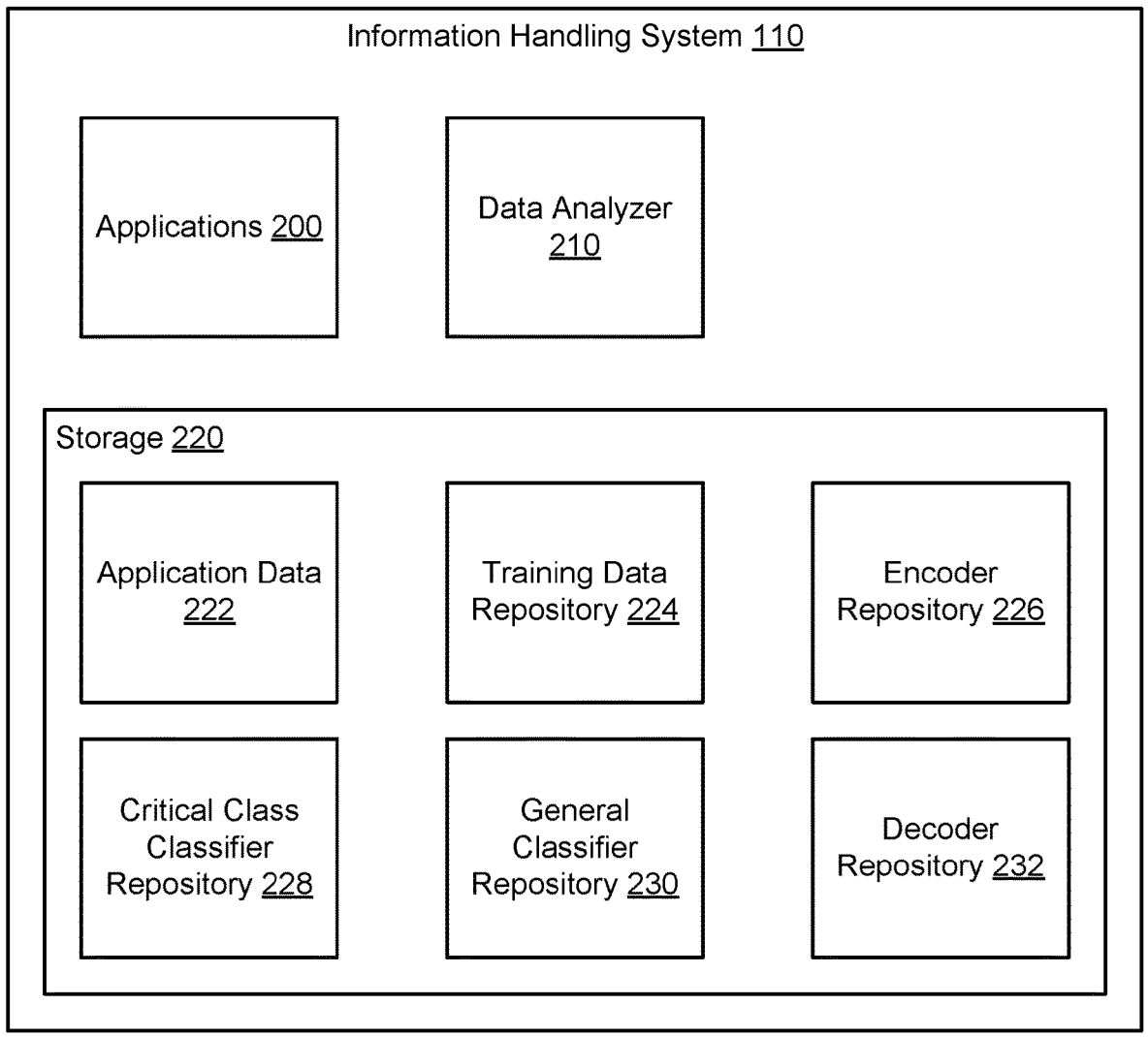
FIG. 2 shows a diagram of an information handling system in accordance with one or more embodiments of the invention.

Turning to FIG. 2, FIG. 2 shows a diagram of an information handling system (110) in accordance with one or more embodiments of the invention. As discussed above, the information handling system (110) may provide data analysis services.

To provide data analysis services, the information handling system (110) may include applications (200), a data analyzer (210), and storage (220). Each of these components is discussed below.

The applications (200) may provide computer implemented services. The applications (200) may be similar to or different from applications hosted by clients that provide similar or different computer implemented services. As will be discussed in greater detail below, the data analyzer (210) may provide data analysis services for the applications (200). The data analyzer (210) may provide similar data analysis services to applications hosted by clients by, for example, providing the clients (100, FIG. 1) with analysis models usable to provide at least a portion of the data analysis services.

The data analyzer (210) may provide data analysis services to the applications (200) and/or other types of entities. The data analysis services may be used to identify objects in data structure. For example, when an application performs its functionality, it may obtain an image. The image may specify the arrangement and other characteristics of the pixels that form the picture. However, the image may not specify representations of other entities included in the picture. The data analyzer (210) may analyze the picture to identify whether any objects of relevance to the applications (200) is present in the pictures. For a graphical representation of this process of analyzing data structures, refer to FIG. 3.

To provide data analysis services, the data analyzer (210) may (i) obtain representative data (e.g., data that includes objects to be identified and classifications indicating the presence of the objects in the data), (ii) generate an analysis model based on the representative data, and (iii) use the analysis model to ascertain whether objects are included in other data structures which have not been previously classified for the presence of objects. The analysis model may include multiple components including an encoder, a critical object classifier, a general classifier, a data conditioner, and a decoder. These different components may perform different portions of the process of analyzing data. The output of these components may be used to ascertain whether different portions of the analysis performed on the data structures are likely to be accurate or inaccurate. These accuracy determinations may be used to then classify data structures as either including a critical object or not including any critical objects, the type of objects included in the data structures, and whether a new object for which a classification does not exist is present in the data structures. These analysis results may be provided to applications or other entities interested in the outcome of the analysis. By doing so, applications dependent on knowing whether certain types of objects are present in data structures may be provided with such information while limiting the computational load for providing the analysis.

Figure 4:
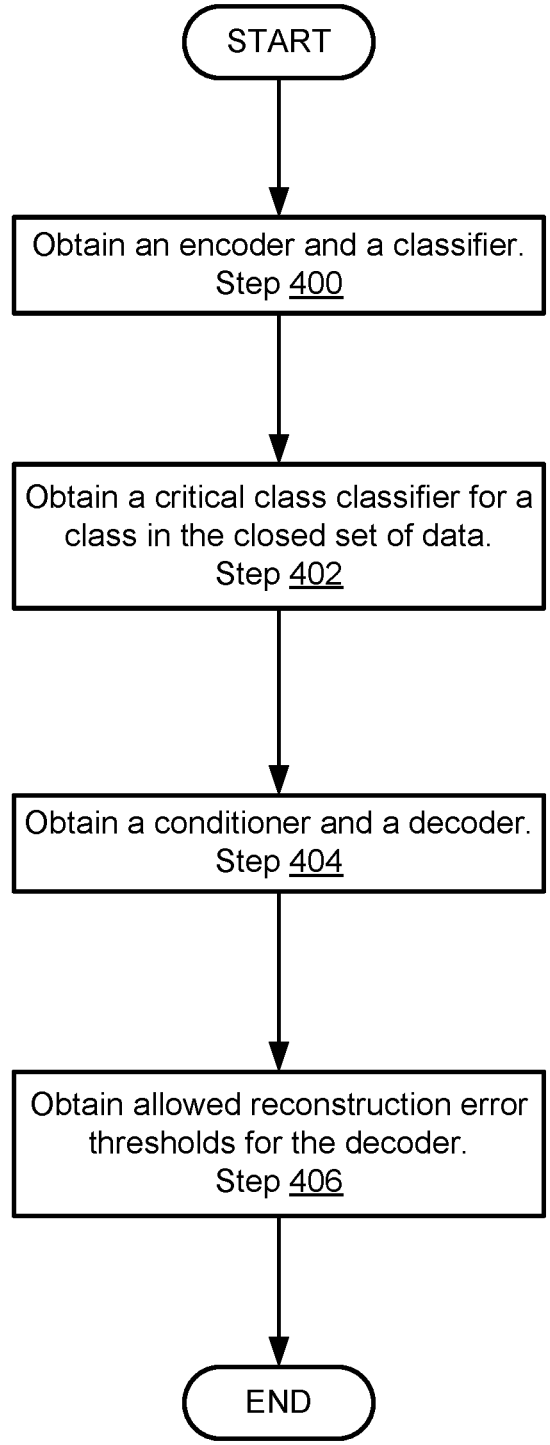
FIG. 4 shows a flowchart of a method of obtaining a data analysis system in accordance with one or more embodiments of the invention.
Figure 5:
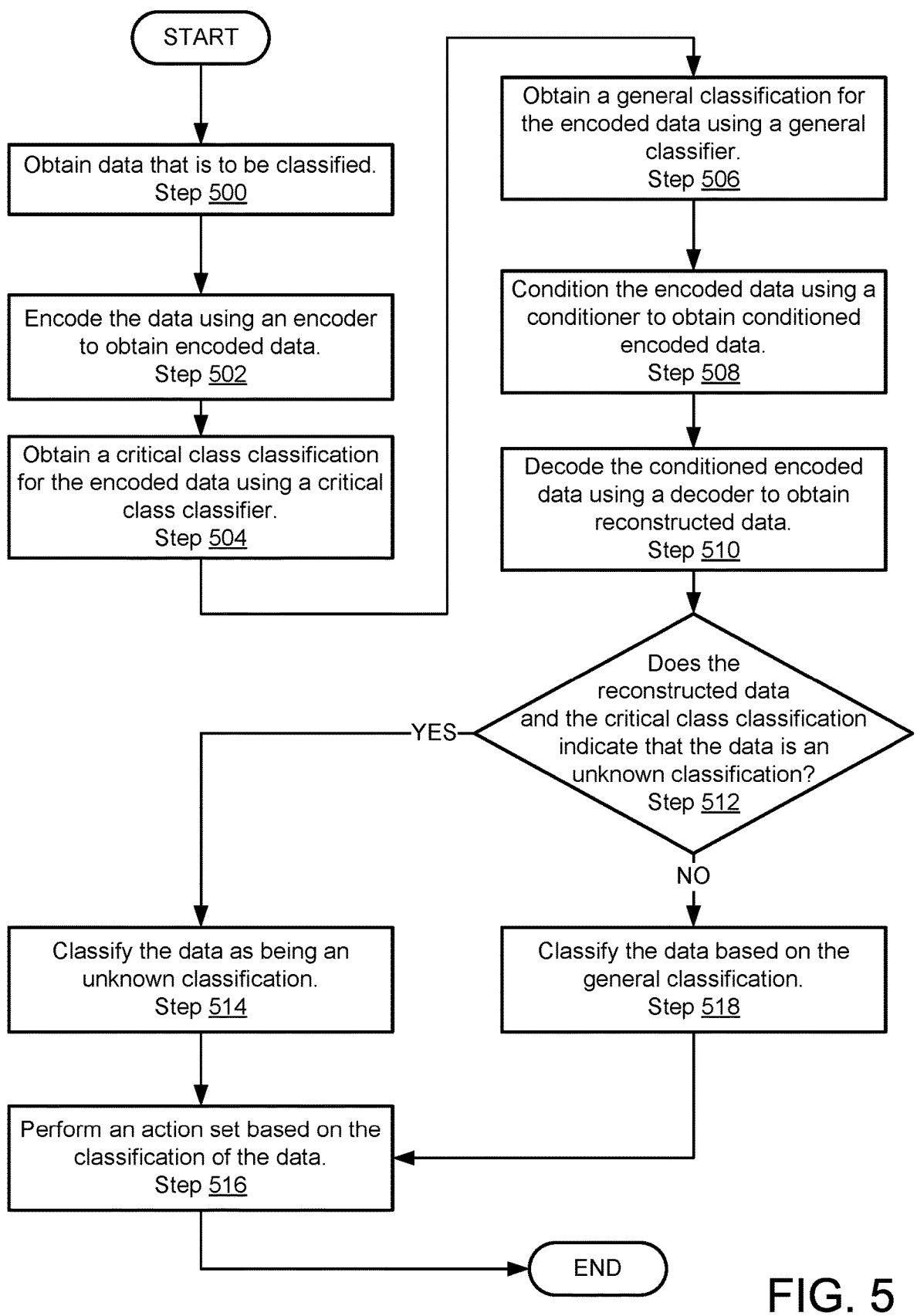
FIG. 5 shows a flowchart of a method of classifying data using a data analysis system in accordance with one or more embodiments of the invention.

When providing its functionality, the data analyzer (210) may perform all, or a portion, of the methods illustrated in FIGS. 4-5.

In one or more embodiments of the invention, the applications (200) and/or data analyzer (210) are implemented using a hardware device including circuitry. The hardware device may be, for example, a digital signal processor, a field programmable gate array, or an application specific integrated circuit. The circuitry may be adapted to cause the hardware device to perform the functionality of the applications (200) and/or data analyzer (210). The applications (200) and/or data analyzer (210) may be implemented using other types of hardware devices without departing from the invention.

In one or more embodiments of the invention, the applications (200) and/or data analyzer (210) are implemented using a processor adapted to execute computing code stored on a persistent storage that when executed by the processor performs the functionality of the applications (200) and/or data analyzer (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data is provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may store data structures including, for example, application data (222), a training data repository (224), an encoder repository (226), a critical class classifier repository (228), a general classifier repository (230), and a decoder repository (232). Each of these data structures is discussed below.

The application data (222) may be implemented using one or more data structures that includes information utilized by the applications (200). For example, the applications (200) may store any type and quantity of data in the application data (222). The application data my include, for example, multidimensional data structures that include objects that may not be identified by the applications (200).

The application data (222) may be maintained by, for example, the applications (200). For example, the applications (200) may add, remove, and/or modify information included in the application data (222).

The data structures of the application data (222) may be implemented using, for example, lists, tables, unstructured data, databases, etc. While illustrated in FIG. 2 as being stored locally, the application data (222) may be stored remotely and may be distributed across any number of devices without departing from the invention.

The training data repository (224) may be implemented using one or more data structures that includes information usable to generate analysis models. For example, the training data repository (224) may include data structures with known objects included in them. These data structures may be used to generate the analysis models.

The training data repository (224) may be maintained by, for example, the data analyzer (210). For example, the data analyzer (210) may add, remove, and/or modify information included in the training data repository (224). Such information may be obtained from any source including, for example, the clients (100, FIG. 1).

The data structures of the training data repository (224) may be implemented using, for example, lists, tables, unstructured data, databases, etc. While illustrated in FIG. 2 as being stored locally, the training data repository (224) may be stored remotely and may be distributed across any number of devices without departing from the invention.

The encoder repository (226) may be implemented using one or more data structures that includes information regarding and/or copies of any number of encoders. An encoder may be a data structure usable to encode a data structure for analysis purposes. The encoders may be obtained using the training data repository (224). For example, neural networks or other types of learning algorithms may be utilized to obtain the encoders by training them using the data included in the training data repository (224). The encoders may take, as input, data that includes unknown objects and encode it for later use by critical class identifiers, general classifiers, and decoders.

The encoder repository (226) may be maintained by, for example, the data analyzer (210). For example, the data analyzer (210) may add, remove, and/or modify information included in the encoder repository (226). Such information may be obtained when a data analysis model is generated.

The data structures of the encoder repository (226) may be implemented using, for example, lists, tables, unstructured data, databases, etc. While illustrated in FIG. 2 as being stored locally, the encoder repository (226) may be stored remotely and may be distributed across any number of devices without departing from the invention.

The critical class classifier repository (228) may be implemented using one or more data structures that includes information regarding and/or copies of any number of critical class classifiers. A critical class classifier may be a data structure usable to ascertain whether a particular object type is included in a data structure. The critical class classifiers may be obtained using the training data repository (224). For example, neural networks or other types of learning algorithms may be utilized to obtain the critical class classifiers by training them, in conjunction with a corresponding decoder, using the data included in the training data repository (224). The critical class classifiers may take, as input, encoded data generated by an encoder and classifies whether the encoded data includes a predetermined object.

The critical class classifier repository (228) may be maintained by, for example, the data analyzer (210). For example, the data analyzer (210) may add, remove, and/or modify information included in the critical class classifier repository (228). Such information may be obtained when a data analysis model is generated.

The data structures of the critical class classifier repository (228) may be implemented using, for example, lists, tables, unstructured data, databases, etc. While illustrated in FIG. 2 as being stored locally, the critical class classifier repository (228) may be stored remotely and may be distributed across any number of devices without departing from the invention.

The general classifier repository (230) may be implemented using one or more data structures that includes information regarding and/or copies of any number of general classifiers. A general classifier may be a data structure usable to classify objects in data structures. The general classifiers may be obtained using the training data repository (224). For example, neural networks or other types of learning algorithms may be utilized to obtain the general classifiers by training them, in conjunction with a corresponding decoder, using the data included in the training data repository (224). The general classifiers may take, as input, encoded data generated by an encoder and classifies objects (e.g., specifies the number and/or types of objects) included in a data structure. In a data analysis model, a critical class identifier and general classifier may operate in conjunction with a single encoder (e.g., both operate on the same encoded data).

The general classifier repository (230) may be maintained by, for example, the data analyzer (210). For example, the data analyzer (210) may add, remove, and/or modify information included in the general classifier repository (230). Such information may be obtained when a data analysis model is generated.

The data structures of the general classifier repository (230) may be implemented using, for example, lists, tables, unstructured data, databases, etc. While illustrated in FIG. 2 as being stored locally, the general classifier repository (230) may be stored remotely and may be distributed across any number of devices without departing from the invention.

The decoder repository (232) may be implemented using one or more data structures that includes information regarding and/or copies of any number of decoders and/or data conditioners. A decoder may be a data structure usable to reconstruct the input data to an encoder. The decoder may be obtained using the training data repository (224). For example, neural networks or other types of learning algorithms may be utilized to obtain the decoders by training them, in conjunction with a corresponding encoder, using the data included in the training data repository (224). The encoders may take, as input, encoded data generated by an encoder and attempt to reconstruct the data input to the encoder.

In some embodiments of the invention, the encoded data may be conditioned using an encoder prior to be provided to a decoder. The conditioner may reduce the likelihood that the decoder will reconstruct data that is not representative of the training data (in contrast to a decoder which will intentionally match encoded data to different types of input data regardless of the deviations between the data used to generate the encoded data and the data utilized to train the encoder-decoder pair). By doing so, the resulting output of the decoder may amplify differences when input data to a decoder does not closely match data used to train the encoder-decoder pair. Consequently, an encoder-decoder pair that utilizes a conditioner on the encoded data prior to decoding may be more likely to return results that match training data only when the input data tightly mirrors the training data. As will be discussed below, these differences may be used to ascertain whether a data structure is more likely to include a previously unclassified object or a classified object that may be of a critical class.

The decoder repository (232) may be maintained by, for example, the data analyzer (210). For example, the data analyzer (210) may add, remove, and/or modify information included in the decoder repository (232). Such information may be obtained when a data analysis model is generated.

The data structures of the decoder repository (232) may be implemented using, for example, lists, tables, unstructured data, databases, etc. While illustrated in FIG. 2 as being stored locally, the decoder repository (232) may be stored remotely and may be distributed across any number of devices without departing from the invention.

While the storage (220) has been illustrated and described as including a limited number and type of data, a storage in accordance with embodiments of the invention may store additional, less, and/or different data without departing from the invention.

While the information handling system (110) has been illustrated and described as including a limited number of specific components, an information handling system in accordance with embodiments of the invention may include additional, fewer, and/or different components without departing from the invention.

Figure 3:
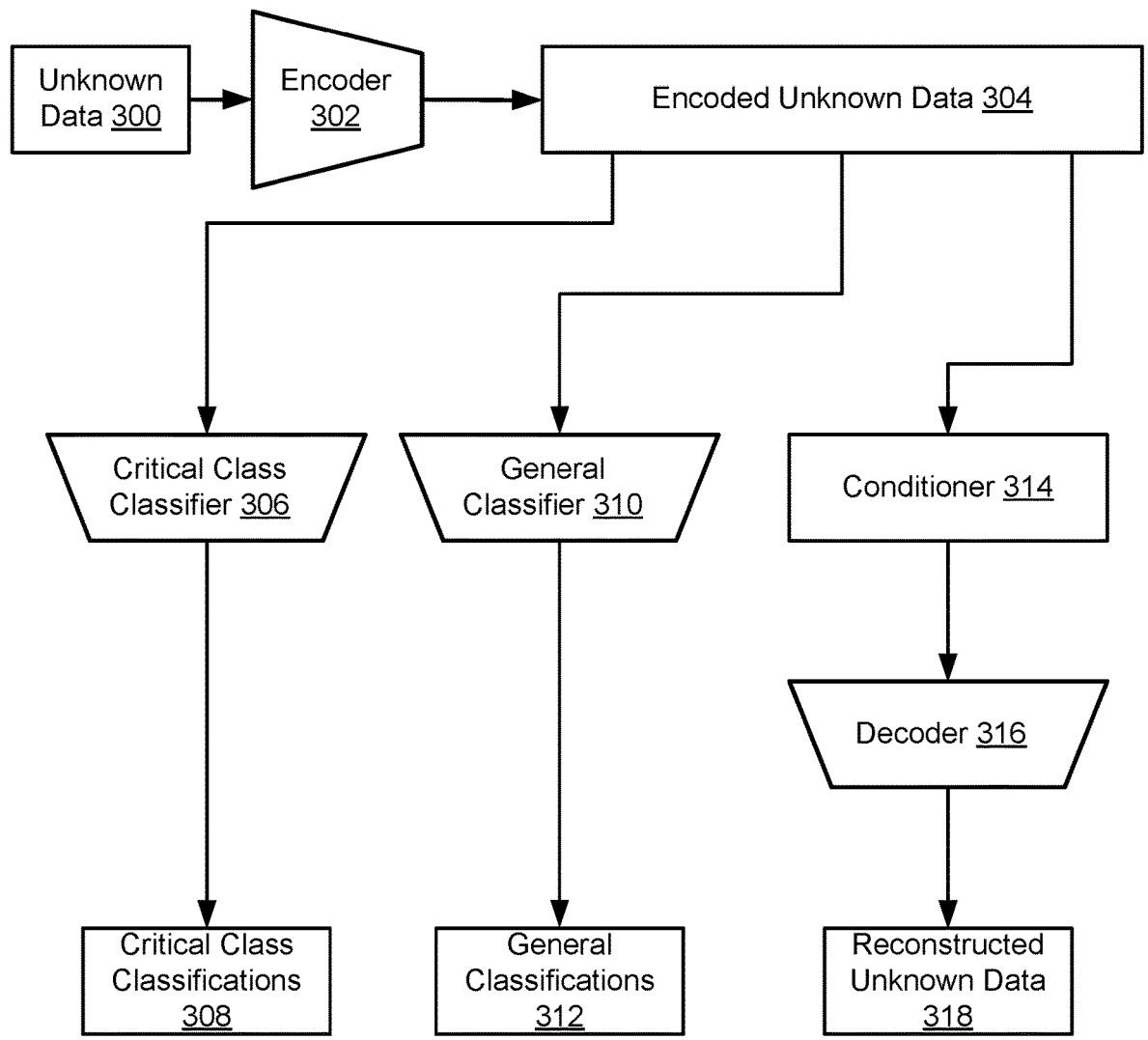
FIG. 3 shows a diagram of a data analysis system in accordance with one or more embodiments of the invention.

Turning to FIG. 3, FIG. 3 shows a graph of an example data analysis model in accordance with one or more embodiments of the invention. As discussed above, the data analysis model may be usable to ascertain whether an object is present in data that has not been classified.

A data analysis model may include an encoder (302), a critical class classifier (306), a general classifier (310), a conditioner (314), and a decoder (316). The encoder (302) and general classifier (310) may be obtained by training a learning algorithm such as a neural network using training data. The resulting encoder (302) may encode unknown data (300) that has not been classified to obtain encoded unknown data (304). The general classifier (310) may operate on the encoded unknown data (304) to obtain general classifications (312) for objects included in the unknown data. The type and quantity of classifications may depend on the training data used to train the encoder (302) and general classifier (310).

The critical class classifier (306) may be obtained using the learning algorithm and the trained encoder (302). Specifically, only the critical class classifier (306) may be trained. The encoder (302) may not be retrained. Consequently, the critical class classifier (306) may operate on the same encoded unknown data (304) generated by the encoder (302).

In contrast to the general classifier (310) which may provide classifications for objects, the critical class classifier (306) may only be trained to output whether a critical class object is present in the unknown data (300). Consequently, the critical class classifier (306) may be small in size and quick to use for classification purposes.

Because the unknown data (300) may include objects that were not included in the training data used to train the encoder (302), critical class classifier (306), and general classifier (310), the general classifier (310) and critical class classifier (306) may general false positives regarding the presence of certain types of objects. For example, these components may mis-classify unknown objects as known objects.

To address this potential source of inaccuracy, the data analysis model may include a conditioner (314) and a decoder (316). The decoder (316) may be obtained using the learning algorithm and the trained encoder (302). Specifically, only the decoder (316) may be trained. The encoder (302) may not be retrained. Consequently, the decoder (316) may operate on the same encoded unknown data (304) generated by the encoder (302).

The conditioner (314) may modify the encoded unknown data (304) so that the decoder (316) is less likely to classify objects that were not present in the training data as objects that were present in the training data. Consequently, when the decoder (316) is presented with an object in a data structure that was not present in the training data, the decoder (316) will create a poor reconstruction of the object (in contrast to when an object present in the training data is reconstructed). As will be discussed below, the poor reconstruction of input may be used to determine whether the general classifier (310) has accurately classified an object or whether the object should, in fact, be classified as an unknown object.

Consequently, the reconstructed unknown data (318) generated by the decoder (316) may be utilized to determine whether the general classifications (312) are likely to be accurately. The critical class classifications (308) may be also be used to make this determination.

For example, when the critical class classification (308) indicates that a critical class object is present in a data structure, then the data analysis model may relax limits on differences between the reconstructed unknown data (318) and the unknown data (300) that would otherwise indicate the presence of an unknown object. In other words, when the critical class classifications (308) indicate that a critical class object is present in an object, the general classifications (312) will be more likely to be used for classification purposes than simply classifying the object as an unknown classification.

While the data analysis model of FIG. 3 has been illustrated and described as included specific numbers and types of components, a data analysis model in accordance with embodiments of the invention may include additional, different, and/or fewer components without departing from the invention.

As discussed above, the system of FIG. 1 may provide data analysis services using data analysis models. FIGS. 4-5 illustrate methods that may be performed by components of the system of FIG. 1 to provide data analysis services.

FIG. 4 shows a flowchart of a method in accordance with one or more embodiments of the invention. The method depicted in FIG. 4 may be performed to obtain a concurrency effect model in accordance with one or more embodiments of the invention. The method shown in FIG. 4 may be performed by, for example, an information handling system (e.g., 110, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, an encoder and a general classifier are obtained. The encoder and classifier may be obtained by training a machine learning model (or other learning algorithm) on a set of training data, as discussed with respect to FIG. 2. The training data may include data and the corresponding classifications. The classifications may include any number of general classifications that reflect types of objects present in the training data. The classifications may have been heuristically, manual classification, or any other method. The resulting encoder and decoder may specify the classification of each portion of the training data and be capable of classifying data with respect to its trained classifications.

The training data may also include data that does not include any objects. Thus, some training data may be useful in training the encoder and general classifier to identify that some data may not include any objects. However, due to the limited amount of training data, the resulting encoder and general classifier may only be able to identify a subset of all of the objects that may be present in data to be analyzed in the future. Thus, the encoder and general classifier may encounter data which it may mis-classify by virtue of the limited amount of training data.

In step 402, a critical class classifier for a class in the closed set of data is obtained. The critical class classifier may be obtained by training an additional classifier while not modifying the operation of the decoder. In other words, the resulting critical class classifier operates on the same output from the encoder as the general classifier.

In one or more embodiments of the invention, the critical class classifier is obtained by first identifying all of the data in the training data as either including critical class objects or not. In other words, the training data is classified as either including or lacking critical class objects.

The additional classifier is trained using the classified training data. The resulting critical class classifier may provide, as output, an indicate of whether a critical class is present in data. In contrast, the general classifier may provide a classification (of many possible classification).

As will be discussed below, the critical class classifier may be used to improve the detection of critical class objects. Because not all objects are of similar significant for application that may utilize the results of performing classification, the critical class classifier may be an efficient method for improving the sensitivity of classification of critical class objects while limiting computing resource consumption.

For example, consider a scenario where video feed is being analyzed for security purposes. In such a scenario, the presence of a handgun or other item of particular interest may be present. In that scenario, the critical class may include handguns in images because these objects are of particular interest to applications tasked with maintaining security.

In one or more embodiments of the invention, the critical class classifier is obtained by pruning a copy of the general classifier. The copy of the general classifier may be pruned by removing routes that lead to any outcome other than a positive critical class classification. Other methods of pruning the copy of the general classifier may be utilized to obtain the critical class classifier without departing from the invention.

In step 404, a conditioner and a decoder are obtained.

The conditioner may be obtained by utilizing input match and non-match condition vectors. These condition vectors include feature-wise linear modulations. The condition vectors may include values $v \in [-1, +1]$. For example, the vectors may have +1 for the true-class of the provided data (e.g., the classification of the data), −1 for all others. By consequence, the condition vector l is of size equal to the number of classes; such that the respective position in l contains the value −1 for all classes except for the class of the data. The respective position may include the value +1. By utilizing the conditioner, the output of the encoder may be conditioned to improve the sensitivity of the decoder. The output of the encoder may be directly element-wise multiplied with l to obtain input for the decoder.

The decoder may then be obtained by training an additional learning model, similar to step 402. However, during training, the output of the encoder may be fed to the condition which, in turn produces output used as input to the decoder.

The resulting encoder, conditioner, and decoder portion of the data analysis model may reconstruct in the input when the input is similar to the training data used to train the decoder. Consequently, when the decoder operates on data that is dissimilar to the training data, the decoder will poorly reconstruct the input data. As will be discussed with respect to FIG. 5, because the reconstructed data does not match the input data, the resulting reconstruction error will be high. This indicator may be used in combination with the critical class classifications to determine whether to accept a classification or treat it as in error and presume that data includes an object that is of an unknown type.

In step 406, allowed reconstruction error thresholds for the decoder may be obtained. The allowed reconstruction error thresholds are predetermined amounts of error that, when exceeded, indicate that data has been misclassified as including a known type of object (rather than an unknown object type). The threshold may be set via any method without departing from the invention.

For example, the thresholds may be obtained by statistically analyzing the error between the reconstructed data and the error to identify the domain over which the error is at an acceptable level.

The method may end following step 406.

Using the method illustrated in FIG. 4, a data analysis model similar to that illustrate din FIG. 3 may be obtained. The data analysis model may then be utilized by the information handling system or provided to another entity (e.g., a client) for use. Consequently, once the data analysis model is obtained, it may be generally distributed and utilized by any number of devices.

Turning to FIG. 5, FIG. 5 shows a flowchart of a method in accordance with one or more embodiments of the invention. The method depicted in FIG. 5 may be performed to respond to object classifications in data in accordance with one or more embodiments of the invention. The method shown in FIG. 5 may be performed by, for example, an information handling system (e.g., 110, FIG. 1). Other components of the system in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, data that is to be classified is obtained. The data may be obtained via any method and from any source. The data may include any type and quantity of data. The data may not have been previously classified.

In step 502, the data is encoded using an encoder to obtain encoded data. The encoder may be configured (e.g., trained) as part of a data analysis model. The data analysis model may have been configured to identify the presence of any number of objects that may be present in data. The encoder may take the data as input and provide the encoded data as output.

Once the encoded data is obtained, the encoded data and/or one or more copies of the encoded data may be stored in memory. As will be discussed below, the encoded data may be utilized by other components of the data analysis model. By storing it (or a copy) in memory, these other components may quickly and/or efficiently utilize the encoded data.

In step 504, a critical class classification is obtained for the encoded data using a critical class classifier. The critical class classification may be obtained by using the encoded data as input to the critical class classifier. The output of the critical class classifier may indicate whether the data includes a critical class object (e.g., something of important interest to an application and was specifically classified as such during training of the critical class classifier).

In step 506, a general classification for the encoded data is obtained using a general classifier. The general classification may be obtained by using the encoded data as input to the general classifier. The output of the general classifier may be a classification for the data. The classification may indicate whether an object is present and a classification for an object if present in the data.

In step 508, the encoded data is conditioned using a conditioner to obtain conditioned encoded data. The encoded data may be obtained by using the encoded data as input to the conditioner. The output of the conditioner may be the conditioned encoded data.

In step 510, the conditioned encoded data is decoded using a decoder to obtain reconstruction data. The reconstruction data may be obtained by using the conditioned encoded data as input to the decoder. The decoder may provide the reconstructed data as output.

As discussed with respect to FIG. 3, the encoder, critical class classifier, general classifier, conditioner, and decoder may form a data analysis model. Each of these components may have been generated using similar training data (e.g., that stem from a same distribution). Consequently, each may act in concert with each other. Consequently, as seen from step 502-610, the to be classified data may only need to be encoded once to obtain all of the data obtained in step 504-510.

In step 512, a determination is made regarding whether the reconstructed data and the critical class classification indicate that the data if of an unknown classification. The determination may be made by comparing the reconstruction error of the reconstructed to a threshold that depends on whether the critical class classification indicates that the data includes a critical class object.

For example, the reconstructed data may be compared to the data to identify an amount of deviation occurred during reconstruction (e.g., reconstruction error). The reconstruction error may then be compared to a first threshold if the critical class classification indicates that the data includes a critical class object or a second threshold if the critical class classification indicates that the data does not include a critical class object. The first threshold may be larger than the second threshold. These threshold may be set via any method (e.g., heuristically) without departing from the invention.

In some embodiments of the invention, thresholds may be normalized by utilizing a parameterization constant factor which may be heuristically determined. Consequently, different threshold may be used for different classes of objects that may be present in the data. Further, in other embodiments of the invention, the thresholds may be normalized based on the completeness of the training data set. For example, lower thresholds may be utilized for dense training data sets while higher threshold may be used for more spares training data sets.

If the reconstruction error exceeds the threshold to which it is compared, then it is determined that the data is of an unknown classification and the method may proceed to step 514. If the reconstruction error does not exceed the classification, then it is determined that the data is of a known classification and the method proceeds to step 518.

In step 514, the data is classified as being an unknown classification. Any indicator may be utilized to make this representation.

In step 516, an action set based on the classification of the data is performed. The action set may include any number and type of actions. For example, the action set may include, for example, (i) providing a copy of the classification to another entity (e.g., an application that requested that the data be classified, (ii) additional classification for the data may be launched when the classification indicates that it is an unknown classification which may cause other data analysis models to be used to attempt to classify the data, (iii) alerts to one or more users may be provided that indicate that an object with unknown classification is present, (iv) the classification may be logged, (v) operation of a client (or other entity) may be modified based on the classification, and/or other actions may be performed. Any number of devices (e.g., clients, information handling systems) may participate in performance of the action set.

The method may end following step 516.

Returning to step 512, the method may proceed to step 518 following step 512 when it is determined that the data is of a known classification.

In step 518, the data is classified based on the general classification. In other words, following step 512, the data is presumed to have been classified correctly and the general classification for the data is utilized to classify the data. The data may be classified using any indicator of the general classification without departing from the invention.

The method may proceed to step 516 following step 518.

Using the method illustrated in FIG. 5, data may be classified in a manner that is more likely to accurately determine the presence of critical class objects if present in the data even when the data may include unknown objects.

To further clarify embodiments of the invention, a non-limiting example is provided in FIGS. 6.1-6.3. These figures illustrate diagrams of the operation of a data analysis system that may hosted by a client or information handling system illustrated in FIG. 1.

Example

Consider a scenario in which a security system is to be deployed. The security system may be tasked with identifying whether guns are present in a video feed from a venue in which various ball games are played. If guns are present, the security system is to alert administrators.

To ascertain whether guns are present in the video feed, a data analysis model as illustrated in FIG. 6.1 is generated. The data analysis model is generated in accordance with the method illustrated in FIG. 4. The data analysis model may include an encoder (602) that generated encoded data (604). The data analysis model may also include a critical class classifier (606), a general classifier (610), a conditioner (614), and a decoder (616). These components may directly or indirectly operate on the encoded data (604) and generate corresponding outputs. The outputs may depend on the input to the encoder.

To obtain these components, a neural network was trained using training data. The training data included images of balls (which are likely to be present in the venue) and images of a guns (which are the critical object to be identified).

After the aforementioned data analysis model is trained and running, pictures from the video feed are fed into it for classification purposes.

The first picture (650) is of a ball. Based on the first picture (650), the critical class classifier (606) generates a critical class classification (620) that indicates that no critical class objects are present in the first picture (650). The general classifier (610) generates a general classification (630) that a ball is present in the first picture (650). The decoder (616) generates a reconstructed first picture (640) of very high accuracy. Consequently, little reconstruction error is present.

Because the first picture (650) was not classified as including a critical class object, the reconstruction error is compared to a low threshold. However, because the reconstruction error is low, it does not exceed the low threshold. Accordingly, the general classification (630) is used to classify the first picture (650) as including a ball.

Turning to FIG. 6.2, after the first picture (650) is classified, a second picture (652) is provided to the data analysis system. A wrench is depicted in the second picture (652).

Based on the second picture (652), the critical class classifier (606) generates a critical class classification (622) that indicates that a critical class object is present in the second picture (652). This is a misclassification because no gun is present in the second picture (652).

The general classifier (610) generates a general classification (632) indicating that a gun is present in the second picture (652). This is also a misclassification.

The decoder (616) generates a reconstructed second picture (642). However, by virtue of conditioning of the encoded data (604) by the conditioner (614), high reconstruction error is present in the reconstructed second picture (642).

Because the second picture (652) was classified as including a critical class object, the reconstruction error is compared to a high threshold. However, because the reconstruction error is high, it still exceeds the high threshold. Accordingly, the general classification (630) is not used to classify the second picture (652). Rather, the second picture (652) is classified as including an unknown object. An additional action set may be performed in response to this classification (e.g., to notify administrators of the presence of an unknown object, to perform additional analysis to attempt to identify the unknown object, etc.).

Turning to FIG. 6.3, after the second picture (652) is classified, a third picture (654) is provided to the data analysis system. A gun is depicted in the third picture (654).

Based on the third picture (654), the critical class classifier (606) generates a critical class classification (624) that indicates that a critical class object is present in the second picture (652). This is an accurate classification because a gun is present in the third picture (654).

The general classifier (610) generates a general classification (634) that indicates a gun is present in the third picture (654). This is also an accurate classification.

The decoder (616) generates a reconstructed third picture (644). Low reconstruction error is present in the reconstructed third picture (644).

Because the third picture (654) was classified as including a critical class object, the reconstruction error is compared to a high threshold. Because the reconstruction error is lower than the high threshold, the general classification (630) is used to classify the third picture (654).

Based on the classification of the third picture, the security system immediately alerts security personnel of the presence of the gun.

End of Example

Thus, as illustrated in FIGS. 6.1-6.3, embodiments of the invention may provide a method of classifying critical class objects that is more sensitive to these objects than other, general objects that may be present. Accordingly, entities that rely on identifying the presence of these critical class objects may utilize the classifications to take subsequent action.

Figure 7:
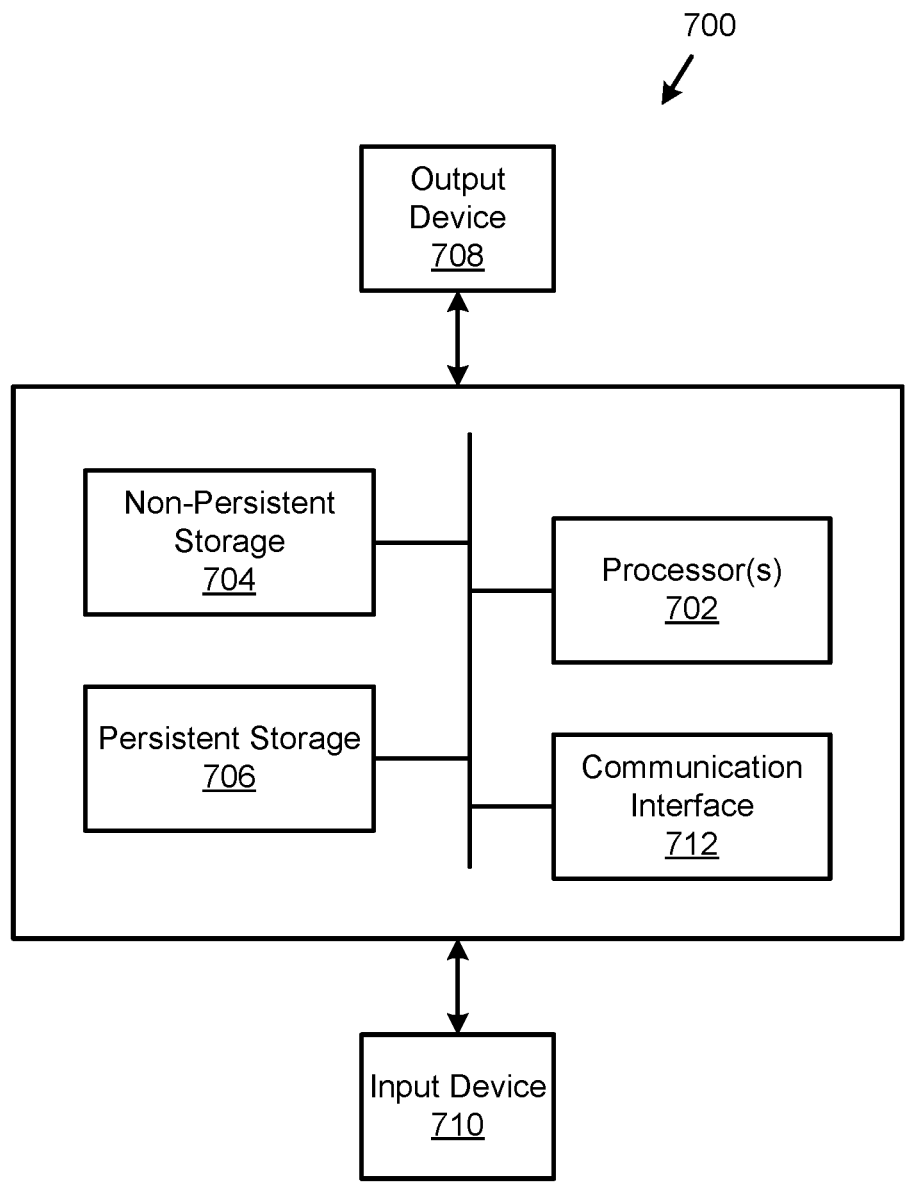
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for classifying data. Specifically, embodiments of the invention may provide for classification of critical objects in data. The method may provide a high degree of detection sensitive for particular classes of objects while limiting consumption of computing resources for classification purposes. To limit computing resources for classification purposes, limited training data may be utilized for classification purposes. Consequently, the resulting data analysis models utilized to classify data may consume fewer computing resources than robust methods without incurring the computational overhead associated with use of robust training data sets for classification purposes.

Thus, embodiments of the invention may address the problem of limited resources in a distributed system. For example, generating a data analysis system using a limited amount of training data, the resulting data analysis system may utilize fewer computing resources for classifying data.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for managing detection of objects, comprising:
   storage for storing:
   an encoder;
   a critical class classifier;
   a general classifier; and
   a decoder;
   a processor programmed to:
   obtain data that may comprise one or more of the objects;
   encode the data using the encoder to obtain encoded data;
   obtain a critical class classification for the encoded data using the critical class classifier;
   obtain a general classification for the encoded data using the general classifier;
   condition the encoded data to obtain conditioned encoded data;
   decode the conditioned encoded data using the decoder to obtain reconstructed data;
   make a determination that the reconstructed data and the critical class classification indicate that the data is an unknown classification;
   classify the data as being an unknown classification based on the determination; and
   perform an action set based on the unknown classification of the data.

2. The information handling system of claim 1, wherein making the determination comprises:
   obtaining a reconstruction error threshold for the decoder;
   increasing the reconstruction error threshold based on the critical class classification indicating that the data is a member of a critical class detected by the critical class classifier to obtain a modified reconstruction error threshold;
   making an identification that reconstruction error of the reconstructed data is larger than the modification reconstruction error threshold; and
   making the determination based on the identification.

3. The information handling system of claim 1, wherein making the determination comprises:
   obtaining a reconstruction error threshold for the decoder;
   making a first identification that the critical class classification indicates that the data is not a member of a critical class detected by the critical class classifier;
   making a second identification that reconstruction error of the reconstructed data is larger than the reconstruction error threshold; and
   making the determination based on the second identification.

4. The information handling system of claim 1, wherein the processor is further programmed to:
   obtain second data that may comprise the one or more of the objects;
   encode the second data using the encoder to obtain second encoded data;
   obtain a second critical class classification for the encoded second data using the critical class classifier;
   obtain a second general classification for the encoded second data using the general classifier;
   condition the encoded second data to obtain conditioned encoded second data;
   decode the conditioned encoded second data to obtain second reconstructed data;
   make a second determination that the second reconstructed data and the second critical class classification indicate that the second data is a known classification;

classify the data as being the second general classification based on the second determination; and perform a second action set based on the second general classification of the second data.

5. The information handling system of claim 4, wherein making the second determination comprises:
obtaining a reconstruction error threshold for the decoder;
increasing the reconstruction error threshold based on the second critical class classification indicating that the second data is a member of a critical class detected by the critical class classifier to obtain a modified reconstruction error threshold;
making an identification that reconstruction error of the second reconstructed data is larger than the modification reconstruction error threshold; and
making the second determination based on the identification.

6. The information handling system of claim 4, wherein making the second determination comprises:
obtaining a reconstruction error threshold for the decoder;
making a first identification that the second critical class classification indicates that the second data is not a member of a critical class which the critical class classifier is trained to detect;
making a second identification that reconstruction error of the second reconstructed data is larger than the reconstruction error threshold; and
making the determination based on the second identification.

7. The information handling system of claim 1, wherein the critical class classification for the encoded data is obtained by using the encoded data as input for the critical class classifier.

8. The information handling system of claim 1, wherein the general classification for the encoded data is obtained by using the encoded data as input for the general classifier.

9. The information handling system of claim 1, wherein conditioning the encoded data reduces a likelihood that reconstructed data will match the data when the data is dissimilar to training data used to obtain the decoder.

10. The information handling system of claim 1, wherein the action set comprises:
providing the unknown classification of the data to an application that requested classification of the data.

11. A method for managing detection of objects, comprising:
obtaining data that may comprise one or more of the objects;
encoding the data using an encoder to obtain encoded data;
obtaining a critical class classification for the encoded data using a critical class classifier;
obtaining a general classification for the encoded data using a general classifier;
conditioning the encoded data to obtain conditioned encoded data;
decoding the conditioned encoded data using a decoder to obtain reconstructed data;
making a determination that the reconstructed data and the critical class classification indicate that the data is an unknown classification;
classifying the data as being an unknown classification based on the determination; and
performing an action set based on the unknown classification of the data.

12. The method of claim 11, wherein making the determination comprises:
obtaining a reconstruction error threshold for the decoder;
increasing the reconstruction error threshold based on the critical class classification indicating that the data is a member of a critical class detected by the critical class classifier to obtain a modified reconstruction error threshold;
making an identification that reconstruction error of the reconstructed data is larger than the modification reconstruction error threshold; and
making the determination based on the identification.

13. The method of claim 11, wherein making the determination comprises:
obtaining a reconstruction error threshold for the decoder;
making a first identification that the critical class classification indicates that the data is not a member of a critical class detected by the critical class classifier;
making a second identification that reconstruction error of the reconstructed data is larger than the reconstruction error threshold; and
making the determination based on the second identification.

14. The method of claim 11, further comprising:
obtaining second data that may comprise the one or more of the objects;
encoding the second data using the encoder to obtain second encoded data;
obtaining a second critical class classification for the encoded second data using the critical class classifier;
obtaining a second general classification for the encoded second data using the general classifier;
conditioning the encoded second data to obtain conditioned encoded second data;
decoding the conditioned encoded second data using the decoder to obtain second reconstructed data;
making a second determination that the second reconstructed data and the second critical class classification indicate that the second data is a known classification;
classifying the data as being the second general classification based on the second determination; and
performing a second action set based on the second general classification of the second data.

15. The method of claim 14, wherein making the second determination comprises:
obtaining a reconstruction error threshold for the decoder;
increasing the reconstruction error threshold based on the second critical class classification indicating that the second data is a member of a critical class detected by the critical class classifier to obtain a modified reconstruction error threshold;
making an identification that reconstruction error of the second reconstructed data is larger than the modification reconstruction error threshold; and
making the second determination based on the identification.

16. A non-transitory computer readable medium comprising computer readable program code, which when executed by a computer processor enables the computer processor to perform a method for managing detection of objects, the method comprising:
obtaining data that may comprise one or more of the objects;
encoding the data using an encoder to obtain encoded data;
obtaining a critical class classification for the encoded data using a critical class classifier;
obtaining a general classification for the encoded data using a general classifier;

conditioning the encoded data to obtain conditioned encoded data;

decoding the conditioned encoded data using a decoder to obtain reconstructed data;

making a determination that the reconstructed data and the critical class classification indicate that the data is an unknown classification;

classifying the data as being an unknown classification based on the determination; and performing an action set based on the unknown classification of the data.

17. The non-transitory computer readable medium of claim 16, wherein making the determination comprises:

obtaining a reconstruction error threshold for the decoder;

increasing the reconstruction error threshold based on the critical class classification indicating that the data is a member of a critical class detected by the critical class classifier to obtain a modified reconstruction error threshold;

making an identification that reconstruction error of the reconstructed data is larger than the modification reconstruction error threshold; and making the determination based on the identification.

18. The non-transitory computer readable medium of claim 16, wherein making the determination comprises:

obtaining a reconstruction error threshold for the decoder;

making a first identification that the critical class classification indicates that the data is not a member of a critical class detected by the critical class classifier;

making a second identification that reconstruction error of the reconstructed data is larger than the reconstruction error threshold; and making the determination based on the second identification.

19. The non-transitory computer readable medium of claim 16, wherein the method further comprises:

obtaining second data that may comprise the one or more of the objects;

encoding the second data using the encoder to obtain second encoded data;

obtaining a second critical class classification for the encoded second data using the critical class classifier;

obtaining a second general classification for the encoded second data using the general classifier;

conditioning the encoded second data to obtain conditioned encoded second data;

decoding the conditioned encoded second data using the decoder to obtain second reconstructed data;

making a second determination that the second reconstructed data and the second critical class classification indicate that the second data is a known classification;

classifying the data as being the second general classification based on the second determination; and performing a second action set based on the second general classification of the second data.

20. The non-transitory computer readable medium of claim 19, wherein making the second determination comprises:

obtaining a reconstruction error threshold for the decoder;

increasing the reconstruction error threshold based on the second critical class classification indicating that the second data is a member of a critical class detected by the critical class classifier to obtain a modified reconstruction error threshold;

making an identification that reconstruction error of the second reconstructed data is larger than the modification reconstruction error threshold; and making the second determination based on the identification.

* * * * *